United States Patent [19]
Kashiwagi

[11] Patent Number: 5,267,623
[45] Date of Patent: Dec. 7, 1993

[54] MOUNTING STRUCTURE FOR A POWER UNIT OF AN AUTOMOBILE

[75] Inventor: Akihiro Kashiwagi, Hatsukaichi, Japan

[73] Assignee: Mazda Motor Corporation, Hiroshima, Japan

[21] Appl. No.: 857,581

[22] Filed: Mar. 25, 1992

[30] Foreign Application Priority Data

Mar. 27, 1991 [JP] Japan .................................. 3-063119
Mar. 27, 1991 [JP] Japan .................................. 3-063120

[51] Int. Cl.⁵ ........................ B60K 5/12; B60K 17/24
[52] U.S. Cl. .................................. 180/58; 180/295; 180/377; 180/380
[58] Field of Search ............... 180/58, 57, 61, 295, 180/377, 375, 380

[56] References Cited

U.S. PATENT DOCUMENTS

| | | | |
|---|---|---|---|
| 3,542,147 | 11/1970 | Troy et al. | 180/295 |
| 3,998,290 | 12/1976 | Sivers | 180/380 |
| 5,036,943 | 8/1991 | Kashiwagi | 180/380 |
| 5,067,582 | 11/1991 | Muller | 180/380 |

FOREIGN PATENT DOCUMENTS 56-28053 3/1981 Japan .

*Primary Examiner*—David M. Mitchell
*Attorney, Agent, or Firm*—Keck, Mahin & Cate

[57] ABSTRACT

A drive train system for an automobile includes a power unit, a differential and a rigid frame coupling the power unit and the differential. The drive train system is oriented so that it extends in the lengthwise direction of the automobile, and has an engine mounted near the front end of the automobile body and providing the automobile with rear wheel drive. A structure used for mounting the drive train system includes power unit mounts for supporting primarily the power unit and a differential mount for supporting primarily the differential. The power unit mounts are disposed at a position or positions either in front of or behind the center of gravity of the whole drive train system in the lengthwise direction of the automobile, and the differential mount is disposed, depending on the position of the power unit mounts, at a position either rearward of or forward of axle shafts of the differential in the lengthwise direction of the automobile. As a result, a force tending to rotate the differential when the automobile quickly accelerates is compensated for by a force applied to the differential mount in a static state of the automobile.

8 Claims, 6 Drawing Sheets

1

MOUNTING STRUCTURE FOR A POWER UNIT OF AN AUTOMOBILE

BACKGROUND OF THE INVENTION

Field of the Invention

This invention relates to a mounting structure for a drive train system including a power unit of an automobile and, more particularly, to a mounting structure for a drive train system of an automobile which has a power plant frame rigidly coupling the power unit with a differential.

Description of Related Art

In a previously known drive train mounting structure, a power unit is mounted in a front portion of an automobile body and includes an engine and a transmission. A differential is mounted in a rear portion of the automobile body. The power unit and the differential are rigidly coupled by a cross-sectionally unshaped power plant frame, which is flexible so that it has a low resistance to torsion and yet rigidly resists bending forces. Such a drive train mounting structure is described in, for instance, Japanese Unexamined Patent Publication No. 56-28,053. Coupling of the power unit and the differential by such a power plant frame provides a comfortable ride, since the differential is prevented from being subjected to irregular rolling movement around a cross-axial line passing through a mounting portion of the engine. Such irregular rolling movement may, for example, be induced by a torque reaction of the power unit.

In a power unit mounting structure such as that mentioned above, the power unit and the differential are each secured to a cross member connected to the automobile body via a respective mount. Therefore, the weight of the whole drive train system, including that of the power unit, the power plant frame and the differential, is supported by the mount for the power unit and the mount for the differential.

However, when the automobile undergoes a quick acceleration and drive power from a drive shaft of the power unit is transmitted to the differential, the differential is prone to rotate around its axle or output shafts. As a result of rotation of the differential, transmission of drive power to the axle shafts is delayed, and this retards acceleration of the automobile.

Weight supported by the mounts causes another problem in the power unit mounting structure mentioned above. More specifically, in such a mounting structure, since a position of the mount or mounts securing the power unit to the cross member is located relatively far forward in the power unit, the whole drive train system is supported by its opposite ends. Therefore, when the engine is vibrated due to up and down motion of the automobile body, a relatively large weight affects the mount or mounts for the power unit. Moreover, because such a structure is supported by both of its ends, a relatively large weight affects the mount for the differential as well. More particularly, it is necessary to stiffen the rubber of the mount or mounts for either the power unit or the differential to adequately support the weight. As a result, noise from the mount may be increased, since the rubber is stiff.

SUMMARY OF THE INVENTION

It is one object of this invention to provide a mounting structure for a drive train system of an automobile, including a power unit, in which rotation of a differential, particularly during quick acceleration, is suppressed, so that an improved acceleration is realized.

It is another object of this invention to provide a mounting structure for a drive train system of an automobile in which weight applied to each of the mounts for the power unit and the differential is relatively small and noise from the mounts is reduced.

The forgoing objects are accomplished, according to the present invention, by providing a particular drive train system mounting structure which has a power unit mount for the power unit disposed at a particular position relative to the center of gravity of a drive train system, such a drive train system which includes the power unit, a differential and a rigid frame interconnecting the power unit and the differential. A differential mount for the differential is also disposed at a particular position relative to axle shafts provided at the differential.

According to a preferred embodiment of the present invention, the power unit mounts are connected to a frame structure of the automobile and disposed on the power unit at a position forward of the center of gravity of the drive train system. The differential mount is disposed at a position rearward of the axle shafts. In one particularly preferred embodiment, the power unit mounts are disposed between the center of gravity of the drive train system and that of the power unit.

According to another preferred embodiment of the present invention, the power unit mounts are connected to a frame structure of the automobile and disposed on the power unit at a position rearward of the center of gravity of the drive train system. The differential mount is disposed at a position forward of the axle shafts.

BRIEF DESCRIPTION OF THE DRAWINGS

The above and other objects and features of the present invention will be apparent to those skilled in the art from the following description of preferred embodiments thereof when considered in conjunction with the drawings, in which.

DETAILED DESCRIPTION OF THE PREFERRED EMBODIMENTS

Figure 1:
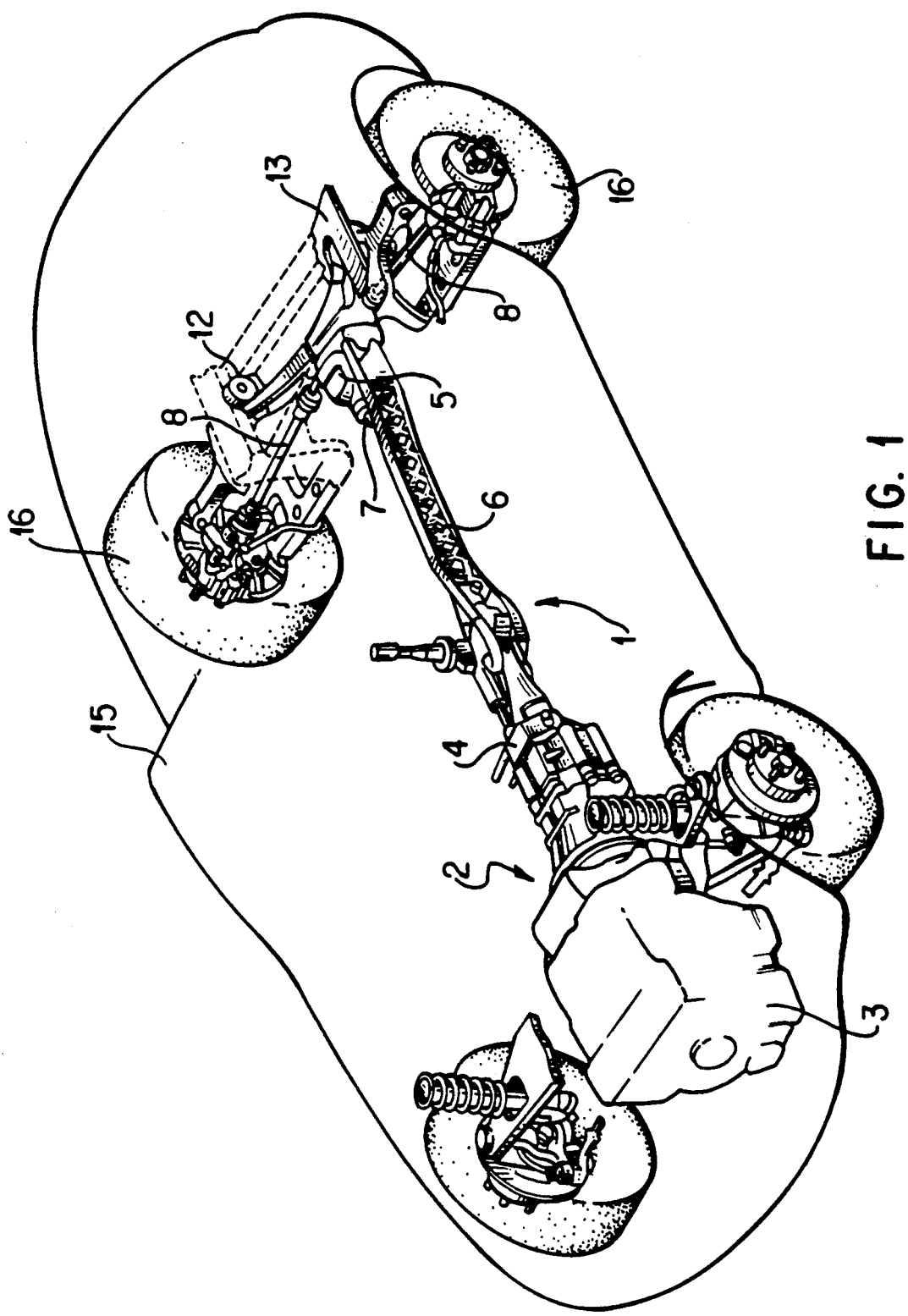
FIG. 1 is a schematic perspective view showing a drive train system mounting structure disposed in an automobile body according to a preferred embodiment of the present invention.
Figure 2:
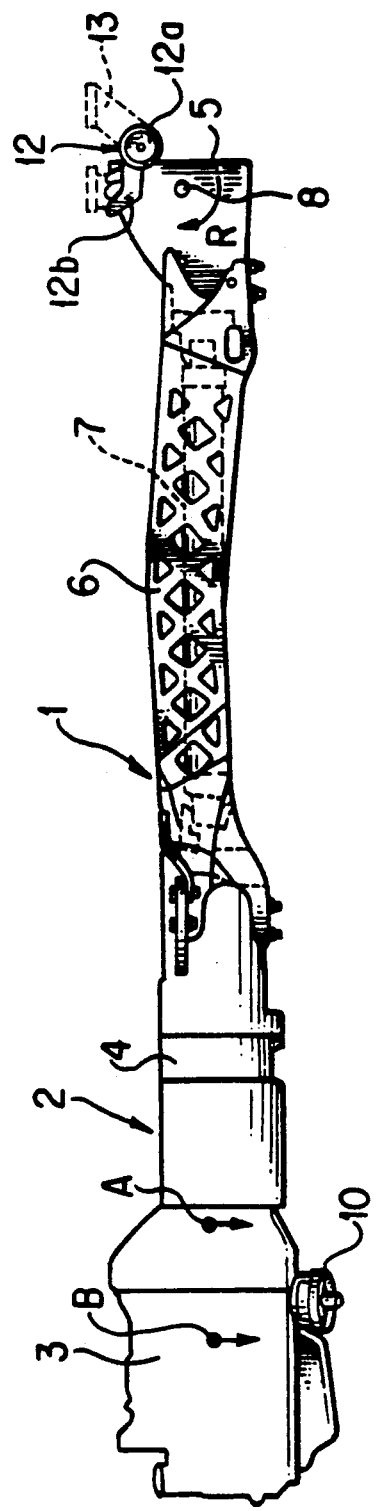
FIG. 2 is a schematic side view showing a drive train system according to the embodiment of the present invention shown in FIG. 1.
Figure 3:
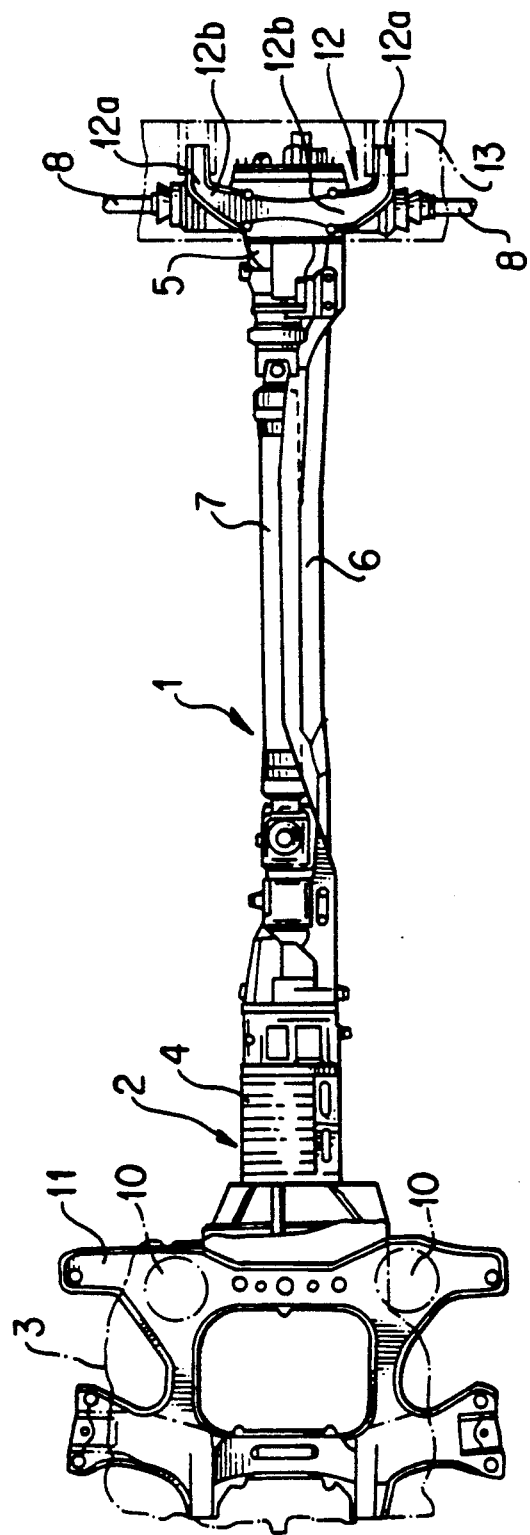
FIG. 3 is a plan view, with part of an engine broken away, showing a drive train system according to the embodiment of the present invention shown in FIG. 1.

Referring to FIGS. 1 to 6 and, in particular, to FIGS. 1 to 3, a drive train system 1 mounted in an automobile body 15, according to a preferred embodiment of the present invention, is shown. The drive train system 1 is provided to propel an automobile having four wheels 16. The automobile has an engine 3 mounted, on a frame structure, near the front end of the automobile body 15. The engine 3 provides the automobile with rear wheel drive. The drive train system 1 includes a power unit 2, formed partly by the engine 3, mounted in an appropriate front portion of the automobile body 15, a differential 5 mounted in a rear portion of the automobile body 15 between a pair of rear drive wheels 16, 16, and a rigid power plant frame 6 disposed between the power unit 2 and the differential 5 and substantially rigidly coupling them together. The drive train system 1 is installed in the automobile body 15 so as to extend in the lengthwise direction of the automobile.

The power unit 2 includes both the engine 3 and a transmission 4. The engine and the transmission are mechanically connected in a known manner so that drive power is transferred from the engine 3 to the transmission 4. A drive shaft 7 extends from the transmission 4 of the power unit 2 in the lengthwise direction and is connected to both the transmission and the differential 5 mounted in a rear position in the automobile body 15. Therefore, drive power from the engine 3 is transmitted to the differential 5 via the drive shaft 7. A pair of axle shafts 8, 8 is arranged so that the shafts project laterally from the differential, which is located on the frame structure and at a central portion of the automobile, to both sides of the automobile. The axle shafts 8,8 link the differential 5 to the left and right rear drive wheels 16, 16, respectively. The power plant frame 6, disposed approximately parallel to the drive shaft 7, is bent in its central portion so that it is slightly crooked. The power plant frame 6 has a hollow rectangular Unshaped structure, in section, opening to one side, for example, the right side of the automobile as shown in FIG. 1. Consequently, the bending rigidity of the power plant frame is relatively large, but the resistance of the power plant frame 6 to twisting is relatively low.

In FIG. 2, a point A represents a position of the center of gravity of the whole drive train system 1, which includes the power unit 2, the differential 5, the power plant frame 6 and the drive shaft 7. A point B represents a position of the center of gravity of the power unit 2 only. As mentioned above, the power unit 2 includes the engine 3 and the transmission 4.

Figure 4:
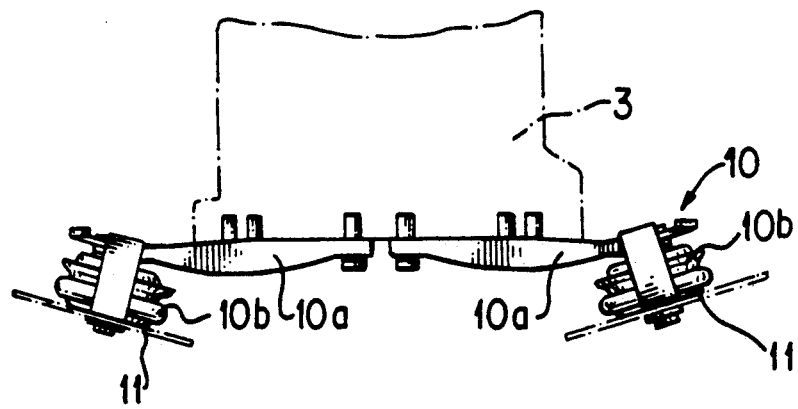
FIG. 4 is a side view of power unit mounts, as seen from a front side of the automobile, according to the embodiment of the present invention shown in FIG. 1.
Figure 5:
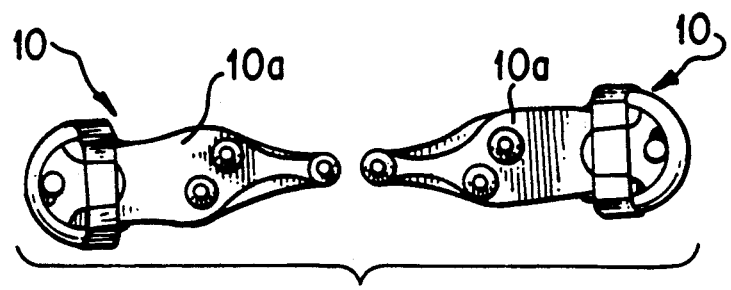
FIG. 5 is a plan view of the power unit mounts shown in FIG. 4.

The power unit 2 is secured, via a pair of power unit mounting means, or mounts, 10, to a part of a frame structure, formed by a front cross member 11, which is secured in a conventional manner to the automobile body 15. The pair of the power unit mounts 10 primarily supports the power unit 2. As shown in FIGS. 4 and 5, each power unit mount 10 includes a bracket 10a and a rubber element 10b. A pair of the brackets 10a is secured to the underside of the engine 3. Each bracket 10a extends outwardly and transversely, or widthwise of the automobile, from the engine 3 toward the sides of the automobile, and is mounted on the front cross member 11 via one of a pair of the rubber elements 10b, respectively. The power unit mounts 10 are located at positions closer to the front end of the automobile or vehicle body 15 than the point A, which represents the center of gravity of the whole drive train system 1, as noted above. Further, the positions at which the power unit mounts 10 are disposed are, in the lengthwise direction of the vehicle, between the point A, which represents the center of gravity of the whole drive train system 1, and the point B, which represents the center of gravity of the power unit 2. Moreover, the power unit mounts 10 are disposed at positions that are nearer to point B than to point A, as shown in FIG. 2.

Figure 6:
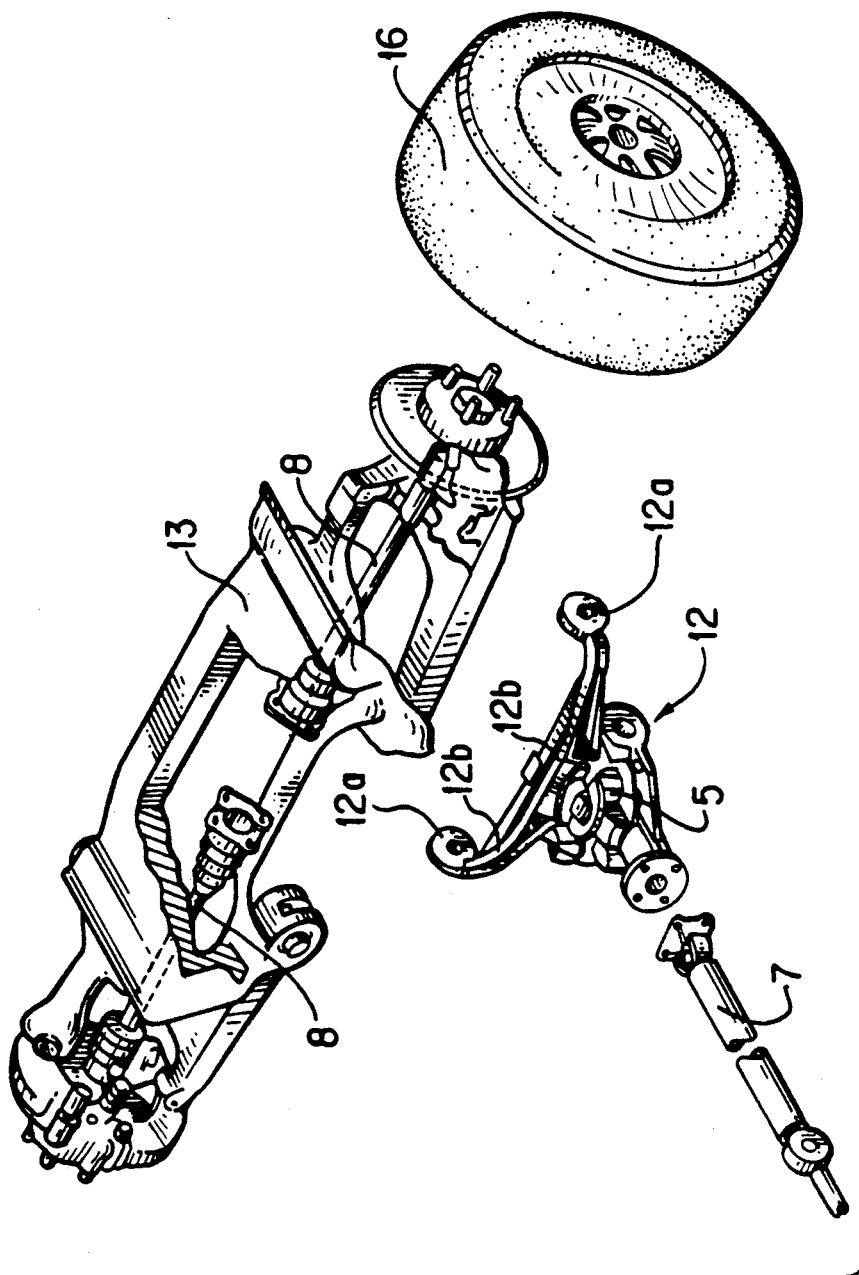
FIG. 6 is a perspective exploded view showing a structure around a differential according to the first preferred embodiment of the present invention.

The differential 5 is secured to another part of the frame structure, formed by a rear cross member 13, via a differential mount 12 forming a differential mounting means for primarily supporting the differential 5. The rear cross member 13 is secured to the automobile body 15. As shown in FIGS. 3 and 6, the differential mount 12 is fixed to an upper portion of the differential 5. The differential mount 12 has two leg portions 12b which extend widthwise relative to the automobile, and ring portions 12a at laterally outer ends of the differential mount which extend rearwardly from the leg portions 12b. At each end of the differential mount 12, in the widthwise direction of the automobile, one of the ring portions 12a and a rubber element (not shown) are disposed so that the differential 5 is partially suspended by the ring portion and rubber element from the rear cross member 13. The position of the ring portions 12a and the rubber elements at the ends of the differential mount 12 and, in particular, the position at which the differential mount 12 is connected to the rear cross member 13, is rearward of the axle shafts 8 extending from the differential 5.

In operation, since the power unit mounts 10 are disposed at a position or positions forward of the point A, which represents the center of gravity of the whole drive train system 1, a part of the weight of the drive train system 1 is exerted on the differential mount 12 so as to constantly apply to the mount 12 a downward force, i.e. , a force acting in the gravitational direction. Meanwhile, when the vehicle accelerates quickly, the differential 5 rotates around central axes of the axle shafts 8, 8. Such rotation is depicted by arrow R in FIG. 2. In this state, since the ends of the differential mount 12 are disposed at a position rearward of the axle shafts 8, 8, the force that tends to cause the differential 5 to rotate in the direction of arrow R forces or rotates the differential 5 up. Since part of the force that lifts the differential 5 up is exerted in a direction opposite to the direction in which the weight of the drive train system 1 acts in a static state, the force and the weight compensate each other during quick acceleration. As a result, the rotation of the differential 5 is reduced, and the acceleration of the automobile is improved.

The power unit mounts 10 are disposed between point A and point B, as shown in FIG. 2, and the power unit mounts 10 are positioned much closer to the point A, which represents the center of gravity of the whole drive train system 1, than is the differential mount 12. Consequently, the power unit mounts 10 support almost the entire weight of the drive train system 1. The differential mount 12 supports the remainder of the weight of the drive train system. Since the differential mount 12 has a relatively small load applied to it, the use of a relatively soft rubber in the differential mount 12 is possible in order to reduce noise.

By disposing the power unit mounts 10 closer to point B than to point A, even if the power unit 2 is vibrated by up and down notion of the automobile, dynamic force exerted on the power unit mounts 10 varies a relatively small amount. Therefore, it is possible to apply a relatively soft rubber to the power unit mounts 10 to reduce noise.

Figure 7:
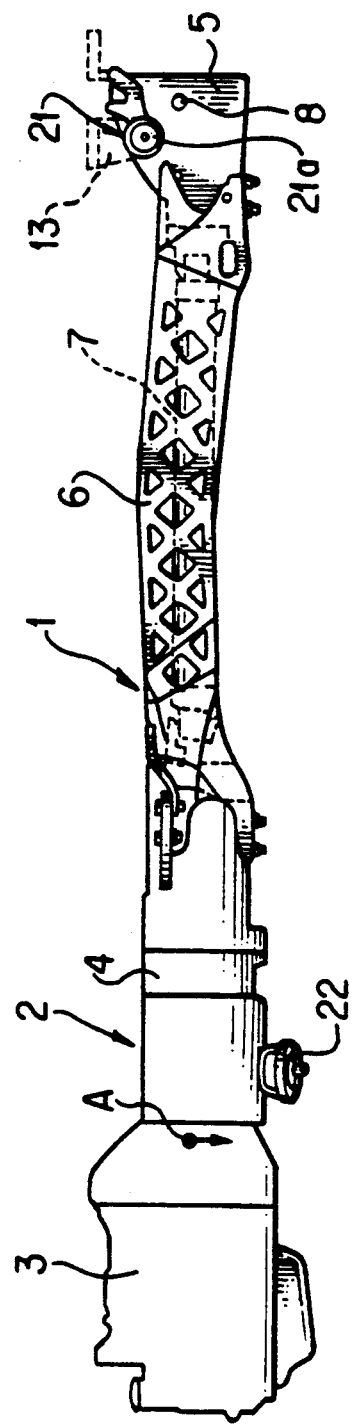
FIG. 7 is a schematic side illustration showing a drive train system according to another preferred embodiment of the present invention.

Referring to FIG. 7, a power unit mounting structure according to another preferred embodiment of the present invention is shown. In this embodiment, the positions of power unit mounts 22 and differential mounts 21 are different from those of the power unit mounting structure described above.

The power unit mounts 22 primarily support the power unit 2 in a manner similar to the power unit mounts 10 described above. The power unit mounts 22 are disposed at positions rearward of a point A, which represents the position of the center of gravity of the drive train system 1. The ends 21a of the differential mount 21, which connect the differential mount to the rear cross member 13, are disposed at positions forward of the axle shafts 8. The differential mount 21 has a structure which is otherwise substantially the same as that of the differential mount 12.

Since the power unit mounts 22 are located at positions rearward of the point A, the mounts 22 act as fulcrums. Force applied by the power plant frame 6 to the differential 5, in a static state, pushes up the differential 5. This force is transferred to the ends 21a of the differential mount 21. Meanwhile, when the vehicle quickly accelerates, the differential 5 is prone to rotate around the axle shafts 8 in the same direction as that indicated by arrow R shown in FIG. 2. Since the ends of the differential mount 21 are disposed at positions forward of the axle shafts 8, force which is produced by the tendency of the differential 5 to rotate, which tends to pull the differential mount 21 down, is exerted on the differential mount 21. Therefore, the force which tends to pull the differential mount 21 down, in a state of quick acceleration, is opposed to the force which pushes up the differential 5 in the static state. This results in a reduction of the rotation of the differential 5 in a state of quick acceleration and improves acceleration of the automobile.

It is to be noted that although, as described above, the power unit is provided as a unit in which an engine and a transmission are directly combined with each other, the power unit may be constructed so that an engine and a transmission are connected through a drive shaft.

It is also to be noted that although the power unit is provided as a unit including an engine and a transmission, it may include only an engine. In this case, the point B, which represents the center of gravity of the power unit, represents the center of gravity of the engine alone.

Finally, it is to be understood that although the present invention has been described in detail with respect to preferred embodiments thereof, various other embodiments and variations may occur to those skilled in the art which fall within the scope and the spirit of the invention. It is intended that such other embodiments and variations be covered by the following claims.

What is claimed is:

1. A structure for mounting a drive train system in an automobile body, said drive train system having a power unit and a differential body, said drive train system having a power unit and a differential, including a pair of axle shafts for driving wheels provided at each side of an automobile, said power unit and said differential having a rigid frame disposed therebetween and substantially rigidly coupling said power unit and said differential, said power unit, said differential and said frame together forming said drive train system which extends in a lengthwise direction of said automobile, said power unit being mounted forward of said differential in said lengthwise direction, said structure for mounting the drive train system comprising:

a frame structure including a front cross member, at least partly underlying said power unit, and a rear cross member;

power unit mounting means, provided between said front cross member of said frame structure and said power unit, for supporting primarily said power unit in said automobile body, said power unit mounting means disposed between said front cross member and said power unit at a position forward of a center of gravity of said drive train system; and differential mounting means for supporting primarily said differential in said automobile body, said differential mounting means having a central portion fixed on a portion of said differential and leg portions extending laterally outwardly from said central portion which are connected to said rear cross member of said frame structure at a position rearward of said axle shafts to partially suspend said differential from said rear cross member.

2. A structure according to claim 1, wherein said rigid frame has a U-shaped cross-section open at one side so that its bending rigidity is large and resistance to twisting is low.

3. A structure according to claim 2, wherein said cross members extended in a widthwise direction of said automobile.

4. A structure according to claim 1, wherein said power unit mounting means is disposed between said center of gravity of said drive train system and a center of gravity of said power unit.

5. A structure according to claim 4, wherein said power unit mounting means is disposed at a position that is nearer to said center of gravity of said power unit than said center of gravity of said drive train system.

6. A structure according to claim 5, wherein said power unit includes an engine and a transmission connected to said engine.

7. A structure according to claim 5, wherein said power unit comprises an engine.

8. A structure for mounting a drive train system in an automobile body said drive train system having a power unit and a differential, including a pair of axle shafts for driving wheels provided at each side of an automobile, said power unit and said differential having a rigid frame disposed therebetween and substantially rigidly coupling said power unit and said differential, said power unit, said differential and said frame together forming said drive train system which extends in a lengthwise direction of said automobile, said power unit being mounted forward relative to said differential in said lengthwise direction, said structure for mounting the drive train system comprising:

a frame structure including a front cross member, at least partly underlying said power unit, and a rear cross member;

power unit mounting means, provided between said front cross member of said frame structure and said power unit, for supporting primarily said power unit in said automobile body, said power nit mounting means disposed between said front cross member and said power unit at a position rearward of a center of gravity of said drive train system; and differential mounting means for supporting primarily said differential in said automobile body, said differential mounting means having a central portion fixed to a portion of said differential and leg portions extending laterally outwardly from said central portion which are connected to said rear cross member of said frame structure at a position forward of said axle shafts to partially suspend said differential from said rear cross member.

* * * * *